(12) United States Patent
Kresch et al.

(10) Patent No.: US 10,397,565 B2
(45) Date of Patent: Aug. 27, 2019

(54) IMAGING DEVICE WITH ALIGNMENT ANALYSIS

(71) Applicant: Fluke Corporation, Everett, WA (US)

(72) Inventors: Jeffrey M. Kresch, Minocqua, WI (US); Steffen Ludwig, Oranienburg (DE); Reno Gärtner, Berlin (DE)

(73) Assignee: Fluke Corporation, Everett, WA (US)

( * ) Notice: Subject to any disclaimer, the term of this patent is extended or adjusted under 35 U.S.C. 154(b) by 0 days.

(21) Appl. No.: 15/924,530

(22) Filed: Mar. 19, 2018

(65) Prior Publication Data

US 2018/0213221 A1     Jul. 26, 2018

Related U.S. Application Data

(63) Continuation of application No. 15/272,906, filed on Sep. 22, 2016, now Pat. No. 9,924,160.

(51) Int. Cl.
| | |
|---|---|
| *G01J 5/00* | (2006.01) |
| *G01J 5/10* | (2006.01) |
| *G06T 7/20* | (2017.01) |
| *G06T 7/33* | (2017.01) |
| *G06T 7/66* | (2017.01) |
| *G06T 7/70* | (2017.01) |

(Continued)

(52) U.S. Cl.
CPC .............. *H04N 17/002* (2013.01); *G01J 5/10* (2013.01); *G06T 7/20* (2013.01); *G06T 7/248* (2017.01); *G06T 7/337* (2017.01); *G06T 7/66* (2017.01); *G06T 7/70* (2017.01); *G06T 7/80* (2017.01); *G06T 7/85* (2017.01); *H04N 5/332* (2013.01); *G01J 2005/0077* (2013.01); *G06T 2207/10016* (2013.01); *G06T 2207/30204* (2013.01); *H04N 5/23222* (2013.01)

(58) Field of Classification Search
CPC ........ H04N 5/272; H04N 9/74; H04N 17/002; G06K 9/00765; G01J 5/10; G01J 2005/0077; G06T 7/0018; G06T 7/003; G06T 7/204; G06T 2207/10016; G06T 2207/30204

See application file for complete search history.

(56) References Cited

U.S. PATENT DOCUMENTS

| | | |
|---|---|---|
| 6,667,761 B1 | 12/2003 | Ludwig et al. |
| 7,924,312 B2 | 4/2011 | Packard |

(Continued)

FOREIGN PATENT DOCUMENTS

| | | |
|---|---|---|
| CN | 1630487 A | 6/2005 |
| EP | 2674894 A2 | 12/2013 |
| JP | 2004094050 A | 3/2004 |

OTHER PUBLICATIONS

European Patent Application No. 17192618.1, Extended European Search Report dated Jan. 17, 2018, 10 pages.

*Primary Examiner* — Michael E Teitelbaum
(74) *Attorney, Agent, or Firm* — Fredrikson & Byron, P.A.

(57) ABSTRACT

Disclosed is an imaging device employing a measurement zone directed at a target, where the imaging device can be used in conjunction with a misalignment analysis feature. The imaging device can capture first and second images at different times. The first and second images may be compared, such as by comparing a location of the measurement zone of the imaging device in the first image with a location of the measurement zone of the imaging device in the second image. Based on the comparison, a misalignment indication of the imaging device relative to the target can be provided.

12 Claims, 5 Drawing Sheets

(51) Int. Cl.
*G06T 7/80* (2017.01)
*H04N 5/33* (2006.01)
*G06T 7/246* (2017.01)
*H04N 17/00* (2006.01)
*H04N 5/232* (2006.01)

(56) References Cited

U.S. PATENT DOCUMENTS

| | | |
|---|---|---|
| 2013/0155248 A1 | 6/2013 | Neeley et al. |
| 2013/0155249 A1 | 6/2013 | Neeley et al. |
| 2013/0162835 A1 | 6/2013 | Forland et al. |
| 2014/0071281 A1 | 3/2014 | Wu et al. |

IMAGING DEVICE WITH ALIGNMENT ANALYSIS

RELATED APPLICATIONS

This application is a continuation of U.S. patent application Ser. No. 15/272,906, filed Sep. 22, 2016. The entire contents of this application is incorporated herein by reference.

TECHNICAL FIELD

This disclosure relates generally to imaging devices and, more particularly, to detecting misalignment of imaging devices.

BACKGROUND

Imaging devices can serve to capture a characteristic of a target object (e.g., physical appearance). One type of imaging device can capture a thermal characteristic of a target object and thus serve as a non-contact temperature measurement instrument. Non-contact temperature measurement instruments allow a user to measure the temperature of a surface of an object or portion of an object without touching the object. One common type of non-contact temperature measurement device is an infrared thermometer. Infrared thermometers determine the temperature of an object by measuring the infrared radiation emitted by the object. The amount of infrared radiation that is emitted at particular wavelengths is correlated with the temperature of the object. If the amount of infrared energy emitted by the object and its emissivity are known, then the object's temperature can be determined without contacting the object. The optical system of an infrared thermometer collects the infrared energy from a measurement spot and focuses it upon a detector. The detector then converts the energy to an electrical signal that can be displayed in units of temperature. Many infrared thermometers allow a user to ascertain the temperature of a spot on an object by aiming the thermometer at the object.

Industrial monitoring systems often employ a non-contact temperature thermometer to capture one or more temperatures of a target. Targets can include, in some examples, a piece of manufacturing equipment (e.g., a particular portion of the piece of manufacturing equipment) and/or a product in the midst of a manufacturing process (e.g., on an assembly line). In many industrial monitoring systems, the non-contact temperature thermometer can be adapted to communicate with a remote monitoring station and, in some instances, can be integrated with a manufacturing process control package.

The non-contact temperature thermometer can be mounted in a fixed location appropriate for capturing image data of a desired target. However, in many examples the target can be present in an environment that necessitates installation of the non-contact temperature thermometer at a generally remote location within that environment. For example, the non-contact temperature thermometer may need to be mounted at a location that minimizes risk of damage to the device and/or minimizes interference caused by matter within the environment (e.g., steam, smoke, dirt, etc.). Moreover, a threat to proper operation of non-contact temperature thermometers in many such environments is misalignment of the device relative to the target. Misalignment can be caused by, for instance, vibration or other means of mechanical impact that can occur in many target environments. Currently, routine operation of a non-contact temperature thermometer involves frequent, manual alignment inspection to determine if the non-contact temperature thermometer is properly aligned with the desired target. Such manual alignment inspection can be complicated due to the remote, hard-to-reach location of the non-contact temperature thermometer in many cases.

SUMMARY

Embodiments disclosed herein can be useful in detecting misalignment of an imaging device. In some embodiments, an indication of misalignment of the imaging device relative to a target is generated using a misalignment analysis feature, and in certain further embodiments the positioning of the imaging device is adjusted to correct such misalignment. In some cases, the positioning of the imaging device is adjusted automatically, without having to manually access the imaging device. As a result, embodiments disclosed herein can allow for detection of a misaligned imaging device and thereby eliminate the need for periodic manual inspection to determine if the imaging device is properly aligned with a target. Moreover, particular embodiments disclosed herein can further employ automated adjustments to the positioning of the imaging device according to a degree of detected misalignment, thereby eliminating the need for manual repositioning of the imaging device. Consequently, misrepresentations as to the images captured by the imaging device can be corrected substantially immediately, and therefore reduce risk associated with relying on representations provided by a misaligned imaging device.

Some embodiments include methods of determining misalignment of an imaging device. One such method includes the step of capturing a first image (e.g., a visible light or thermal image) at a first time using the imaging device, and capturing a second image (e.g., visible light or thermal image) at a second time using the imaging device. The second time is subsequent to the first time. The method further includes the step of comparing a location of a measurement zone of the imaging device in the first image with a location of the measurement zone of the imaging device in the second image. This comparison produces a result that can be used to indicate that the imaging device has become misaligned relative to a desired target and/or adjust the positioning (e.g., automatically) of the imaging device.

Certain embodiments include non-transitory computer-readable mediums comprising instructions for causing programmable processors to compare images, and in some cases determine if an imaging device has become misaligned relative to a desired target. One embodiment includes a non-transitory computer-readable medium comprising instructions for causing a programmable processor to receive first image data (e.g., visible light, infrared image data) corresponding to a first image captured by an imaging device and receive second image data (e.g., visible light, infrared image data) corresponding to a second image captured by the imaging device at a time after capturing the first image. The instructions further cause the programmable processor to compare a location of a measurement zone of the imaging device in the first image data with a location of the measurement zone of the imaging device in the second image data. This comparison produces a result that may be used to indicate that the imaging device has become misaligned relative to a desired target and/or adjust the positioning (e.g., automatically) of the imaging device.

Further embodiments include systems in which images are compared, and in some instances used within the system to determine if an imaging device has become misaligned relative to a desired target. One embodiment of a system for determining misalignment of an imaging device includes the imaging device, a remote monitoring station, and a computing device. The imaging device has one or more sensors (e.g., visible light and/or infrared sensor) and is configured to focus energy (e.g., visible light and/or infrared energy) emanating from a target onto a respective one or more of the sensors. The remote monitoring station is in communication with the imaging device. The computing device is in communication with the imaging device and/or the remote monitoring station. The computing device has at least one processor and is configured to receive first image data (e.g., visible light and/or infrared image data) generated by the one or more sensors as well as second image data generated by the one or more sensors. The second image data is captured by the imaging device at a time after the imaging device has captured the first image data. The computing device is further configured to compare the first image data to the second image data to determine whether a change in position of the imaging device has occurred. The computing device is also configured, where a change in position of the imaging device has occurred according to the comparison, to generate a misalignment indication.

The details of one or more examples are set forth in the accompanying drawings and the description below. Other features, objects, and advantages will be apparent from the description and drawings, and from the claims.

DETAILED DESCRIPTION

The following detailed description is exemplary in nature and is not intended to limit the scope, applicability, or configuration of the invention in any way. Rather, the following description provides some practical illustrations for implementing various embodiments of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

Figure 1A:
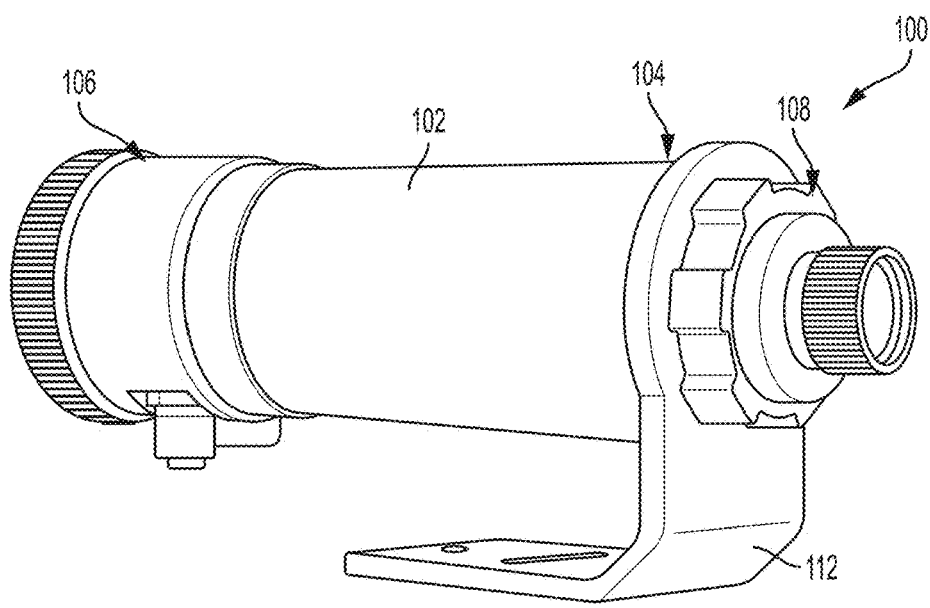
FIG. 1A is a perspective front view of an example non-contact temperature measurement device.
Figure 1B:
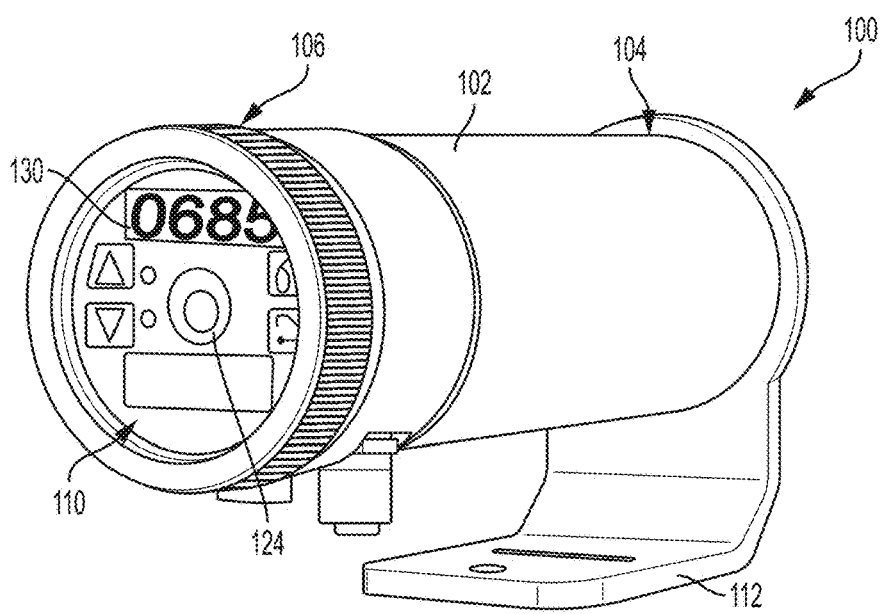
FIG. 1B is a perspective back view of the example non-contact temperature measurement device of FIG. 1A.
Figure 1C:
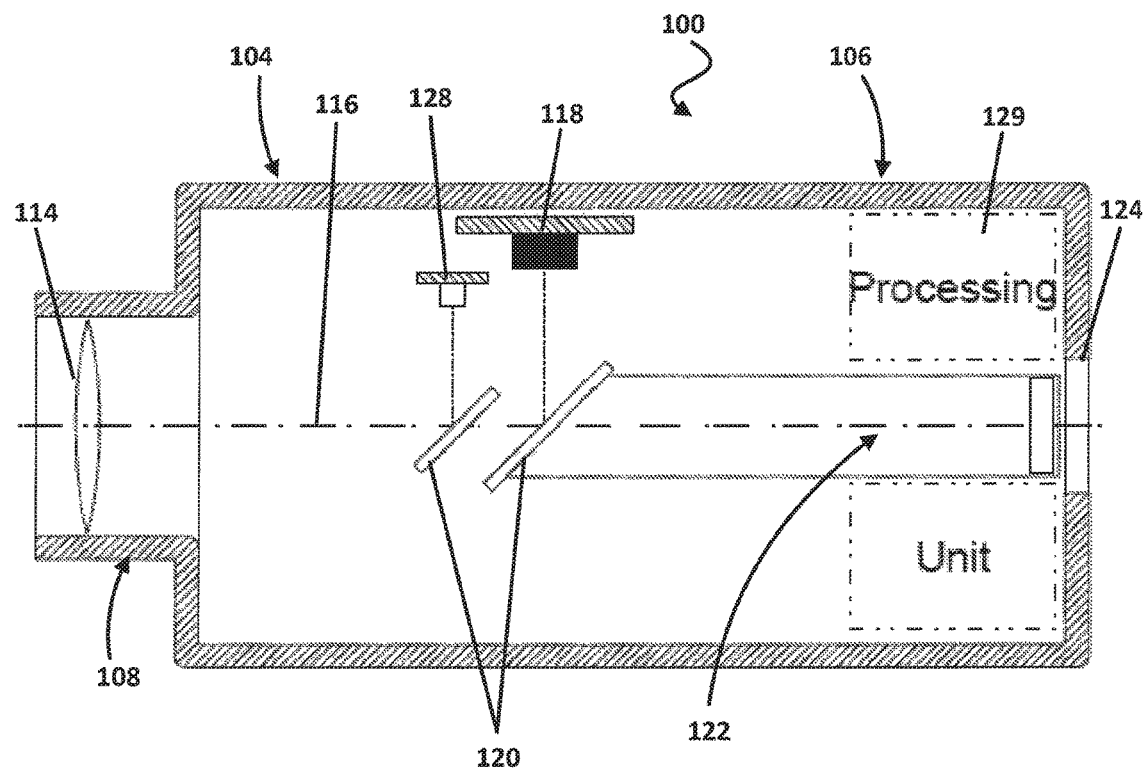
FIG. 1C is a cross-sectional view of the example non-contact temperature measurement device of FIGS. 1A and 1B.

FIGS. 1A-1C show an embodiment of an imaging device 100. The imaging device 100 can serve a variety of functions including, in one example, acting as a non-contact temperature measurement device. FIG. 1A is a perspective front view, while FIG. 1B is a perspective back view of the device 100. FIG. 1C is a cross-sectional view of the device 100. As noted, the device 100 can be used in one application, for instance, to provide information pertaining to a thermal condition of a desired target without having to physically touch the target with the device 100.

The device 100 defines a housing 102 containing various components of the device 100 (some of which are shown in FIG. 1C). The housing 102 has a front portion 104 and a rear portion 106. The front portion 104 of the device 100 can include a lens assembly 108, while the back portion 106 of the device 100 can include a control panel 110. Coupled to the housing 102 can be a mounting component 112. The device 100 can be installed at a desired location using mounting component 112, where the front portion 104 is directed at a target from a distance. After installation, mounting component 112 can be used to facilitate movement of the device 100 relative to the location at which the device 100 is installed (e.g., pivoting and/or titling of the device 100 such as to facilitate realignment with a desired target).

In operation, the front portion 104 of the device 100 is directed at a target. The lens assembly 108 at the front portion 104 can receive visible light and/or radiation in the infrared range of the electromagnetic spectrum emanating from the target. The lens assembly 108 can include various components depending on the application of the device 100. For instance, in the example shown in FIG. 1C the lens assembly 108 includes one lens 114 which can receive visible light and/or infrared radiation emanating from the target. In other examples the lens assembly 108 can include distinct lenses, such as a first lens for receiving visible light from the target and a second lens for receiving infrared radiation from the target. The one or more lenses (e.g., lens 114) can act to focus the received visible light and/or infrared radiation. Additionally, a focus mechanism can be coupled to the lens assembly 108 configured to move one or more lenses of the lens assembly 108 (e.g., lens 114) so as to adjust a focus of one or more images captured by the device 100.

Lens assembly 108 defines an optical axis 116 which passes through the center of curvature of the one or more lenses (e.g., lens 114). Visible light energy received from a target projects through a front of the lens 114 and focuses on an opposite side of the lens 114. This focused visible light energy can be directed onto a visible light sensor 118. Visible light sensor 118 can respond to the focused energy by generating an electrical signal that can be stored in memory and/or converted and displayed as a visible light image. Visible light sensor 118 may include a plurality of visible light sensor elements such as, e.g., CMOS detectors, CCD detectors, PIN diodes, avalanche photo diodes, or the like.

In the illustrated example of the device 100, a beam splitter 120 is included for directing the focused visible light energy from the lens 114 onto the visible light sensor 118. A beam splitter can be useful where a sensor requiring focused energy from the lens assembly 108 is positioned off of the optical axis 116, such as the case in the example configuration shown in FIG. 1C where the light sensor 118 is located approximately 90° relative to the optical axis 116. In this embodiment, the beam splitter 120 is positioned on and angled (e.g., 45°) relative to the optical axis 116 such that a portion of the visible light energy entering the device 100, and focusing through lens 114, is reflected onto the visible light sensor 118. In other examples, a beam splitter need not be included depending on the positioning of the visible light sensor 118 (e.g., where the visible light sensor 118 is positioned along the optical axis 116).

In examples where a beam splitter 120 is included, the unreflected portion of the visible light may pass through the beam splitter 120, along the optical axis 116, and ultimately to a sighting arrangement 122 at the rear portion 106. The sighting arrangement 122, as shown, can be positioned generally concentrically about the optical axis 116. The example device 100 illustrated includes an eyepiece 124 as part of the sighting arrangement 122 to allow a user to visually see the visible light image resulting from the unreflected visible light passing through the beam splitter 120. Where included, the focus mechanism can be used to adjust a focus of the visible light image as seen through the eyepiece 124 via the one or more lenses (e.g., lens 114). The sighting arrangement 122 can be used, for instance, in initially installing the device 100 so as to properly align a measurement zone of the device 100 on a desired target, or portion of a target. For example, the sighting arrangement 122 can allow a user to ascertain where a measurement zone of the device 100 is currently located relative to the desired target and make necessary adjustments to the alignment of the device 100 to position the measurement zone of the device 100 onto the target. Once the measurement zone of the device 100 has been accurately aligned with the desired target, the device 100 can be fixed in place, such as through use of the mounting component 112. In some cases, such as where the device 100 is in communication with a remote monitoring station, the sighting arrangement 122 (and thus the eyepiece 124) need not be included. Where the sighting arrangement is not included, any or all of the functionality of the sighting arrangement described herein can be achieved using the image data captured by the device 100 at the remote monitoring station.

The sighting arrangement 122 can include any means for indicating a size of the measurement zone of the device 100 in context so that a user can properly aim the device 100 to align the measurement zone with the desired target. Examples of sighting means include means which project an indicator onto the target, means which present an intermediate visual indicator between the device and target, and overlay means. In cases where the sighting arrangement is not included, similar sighting means, however, may still be present so as to allow, for example, the remote monitoring station to achieve the described functionality of the sighting arrangement.

Projected indicator means can include, for example, laser sighting as commonly known and used in the art. In such embodiment, a measurement zone can be indicated by projecting visible laser energy onto the target itself. For example, a crosshair laser pattern can be projected for close focus and a border pattern can be projected for standard focus. Intermediate visual indicator means can include, for example, a reticle or other scope on the device. Such an example can be thought of as similar to a rifle scope, wherein a user can look through or around the intermediate visual indicator means and view the target with the indicator in the foreground identifying the measurement zone. Overlay sighting means can include, for example, a video overlay system as known in the art. In one example of a video overlay system, the device includes a visual light camera used in conjunction with a video monitor for displaying a visual representation of the target. Software instructions can be used to position a pattern overlay on the video image of the target that corresponds with the measurement zone. In such embodiments, a processor and instruction set may need to be provided to calculate the appropriate size and positioning of the overlay on the target image. In addition, such methods may require a laser or other distance measurement technique for determining the distance from the lens 114 to the target.

The exemplary device 100 described herein can include one or more reticles (e.g., a clear disc including a cross-hair structure) at various locations, such as forward of the eyepiece 124. The reticle may be included to assist in determining an alignment of the measurement zone of the device 100 with a target. A user can look through the eyepiece 124 and use the reticle to ascertain a current location of the measurement zone of the device 100. Necessary adjustments to the alignment of the device 100 can then be manually made using the reticle so as to position the measurement zone of the device 100 appropriately onto the target. In examples where the sighting arrangement 122, and thus the eyepiece 124, is not included, a reticle can be positioned, for instance, at a location in front of the visible light sensor 118. Such configuration can allow the reticle to be imposed on the visible light image data captured by the sensor 118, and therefore allow a remote monitoring station to use the presence of the reticle to assist in determining an alignment of the measurement zone of the device 100 with a target.

In addition, in some examples the device 100 can receive infrared energy emanating from the target. The infrared energy can be received at the lens assembly 108, such as by projecting through a front of one or more lenses (e.g., the lens 114) and focusing on an opposite side of the one or more lenses. This focused infrared energy can be directed onto an infrared sensor 128 and the infrared sensor 128 can convert the received infrared energy into an electrical signal. The infrared sensor 128 can have associated electronics and/or a processing unit arrangement 129 with the capability to convert raw infrared radiation received at the infrared sensor 128 into temperature and/or digital image data. For example, the signal generated by the infrared sensor 128 can be subsequently electronically amplified, filtered, and converted into digital signal levels by such processing unit arrangement 129. The processing unit arrangement 129 can also include a microcontroller that converts the energy data to temperature. In one embodiment, the microcontroller uses a look-up table to convert the energy data to temperature. In further examples, the microcontroller can perform other appropriate analyses on the data received from the infrared sensor 128. The control panel 110 of the device 100 can include a display screen 130 for indicating a temperature of the measurement zone on the target.

In some embodiments, the infrared sensor 128 can be a single sensor but in other embodiments the infrared sensor 128 can be an IR focal plane array of microbolometer or thermopile detector elements, or could be composed of photon detectors such as photodiodes or phototransistors, or other thermal or photon detection device. One non-limiting example of an infrared sensor is the miniaturized thermal radiation sensor TS-80 manufactured by The Institute for Photonic Technology (IPHT) of Jena, Germany. The TS-80 sensor is a miniaturized multi junction thermopile made by microsystems technology on silicon wafers.

Depending on the location of the infrared sensor 128 within the housing 102 (e.g., where the sensor 128 is positioned off of the optical axis 116, such as shown in FIG. 1C), in some examples an infrared beam splitter 120 can be used to reflect the focused infrared energy onto the infrared sensor 128. In another example, the infrared sensor 128 may be configured to allow visible light to pass through, such as when the infrared sensor 128 is positioned on the optical axis 116, in front of the sighting arrangement 122, and/or in front of the visible light sensor 118. In addition, depending on the location of the infrared sensor 128 relative to the visible light beam splitter 120, the visible light beam splitter 120 may be of a type that is substantially transparent to radiation in the infrared range of the electromagnetic spectrum.

When included, the infrared sensor 128 of the device 100 can have a measurement zone, which as noted previously, in some examples can be ascertainable through use of the eyepiece 124 and reticle. The area of the measurement zone over which the device 100 can detect infrared energy increases as a function of the distance between the device 100 and the target. The measurement zone may correspond, at least in part, to the particular infrared sensor 128 that is used. A measurement zone typically will not have sharply defined edges or borders (e.g., a sharp rectangle), but instead will, typically have blurred edges. In fact, only approximately 90% of the energy detected by the device 100 typically comes from within what the manufacturers typically specify as the main measuring zone. The remaining 10% or so of the energy is collected from a larger zone that lies beyond the boundaries of the main measuring zone due to scattering and the nature of the collection optics in the device (e.g., lens assembly 108). Thus, in operation the device 100 can actually receive infrared energy from an area of a target larger than that indicated by the measuring zone (e.g., via the reticle). As a result, in some applications the device 100 may be configured to account for this nature of received infrared energy.

In some examples, the device 100 collects infrared energy and visible light energy from the target substantially simultaneously (e.g., at the same time). In such examples, visible light data and infrared data generated by the device correspond to the same measurement zone, such as indicated by the reticle, and thus are of the same target, or portion of a target, at substantially the same time. In these examples, the infrared data generated by device 100 is indicative of localized temperatures at the target at a particular time while the visible light data generated by the device 100 is indicative of the same target at the same time. In other examples, the device 100 may collect infrared energy and visible light energy from the target at different times.

To facilitate operation of the device 100, the device 100 can further include, electronics, one or more processors (e.g., processing unit 129), one or more memory units, input/output components, and a power supply. Where memory is included within the device 100, such memory can include but is not limited to, RAM, ROM, and any combination of volatile and non-volatile memory. A power supply can include, but is not limited to, a battery and associated power generation circuit. The power supply can provide power to the visible light and infrared sensors 118, 128, electronics, processor, memory, and/or input/output devices on the device 100. One or more input/output components can be included on the control panel 110. Exemplary input/output components can include inputs for initially setting up the device 100 and associated settings of the device 100, output display 130, speakers, communication devices that operate through wired or wireless communications, control functions for adjusting the focus of the infrared and/or visible light optics, capturing an infrared and/or visible light image, or the like.

During use of the device 100, a processor (e.g., processing unit 129) of the device 100 can control the visible light sensor 118 and/or infrared sensor 128 (when present) to generate visible light and infrared data from a captured target for creating a visible light image and/or measuring a temperature. The visible light data may include luminosity data indicative of the color(s) associated with different portions of the captured target and/or the magnitude of light associated with different portions of the captured target. The processor can generate a "frame" of visible light image data by measuring the response of each visible light sensor element of the device 100 a single time. By generating a frame of visible light data, the processor captures visible light image of a target at a given point in time. The processor may also repeatedly measure the response of each visible light sensor element of the device 100 so as to generate a dynamic image (e.g., a video representation) of a target. In some examples, the visible light sensor 118 may include its own dedicated processor or other circuitry (e.g., ASIC) capable of operating the visible light sensor 118. In some such embodiments, this dedicated processor can provide visible light image data (e.g., RGB image data) to the described processor. In alternative embodiments, a dedicated processor for the visible light sensor 118 may be integrated into a single processor (e.g., processing unit 129).

Where each sensor element of visible light sensor 118 functions as a sensor pixel, the processor can generate a two-dimensional image or picture representation of the visible light from a target by translating an electrical response of each sensor element into a time-multiplexed electrical signal that can be processed, e.g., for visualization on a display and/or storage in memory.

The processor of the device 100 (e.g., processing unit 129) can perform additional operations in various embodiments. For instance, the processor can be used to run various applications including, but not limited to, deciding if the desired target sufficiently fills the measurement zone, averaging output signals (e.g., from the infrared sensor 128) for a period of time to reduce the impact of noisy measurements on the accuracy of the measured condition at the measurement zone, and/or performing misalignment detection as will be discussed later.

As noted, in some examples the infrared and visible light energy collected by the device 100 can be processed locally at the device 100. In some embodiments of the device 100, the processed visible light and/or infrared data can be displayed locally at the device 100 via a display. In such embodiments, a display of the device 100 may be configured to display a visible light image, a non-contact temperature, or both.

Additionally or alternatively, the device 100 can be in two-way communication with a remote monitoring facility, and in particular in some cases a computing device at the remote monitoring facility. Communication between the device 100 and the remote monitoring facility (e.g., the computing device at the remote monitoring facility) can be facilitated via wireless communication or through a wired (e.g., ethernet) connection. In one example, the electronics (e.g., processing unit 129) associated with the visible light sensor 118 and/or infrared sensor 128 are coupled to a connector of an electrical feedthrough assembly (e.g., via a flex circuit). The connector may be coupled to a cable conductor which extends out from the device 100 to a remote monitoring station. The remote monitoring facility can thus receive any data from the device 100 as desired for a particular application, as well as convey any information to the device 100. Commands sent to the device 100 from the remote monitoring facility can be sent via the same connection serving to convey data (e.g., visible light data, infrared data) from the device 100 to the remote monitoring facility.

For example, the remote monitoring facility can display a visible light image and/or a non-contact temperature, each corresponding to a measurement zone of the device 100. This can include display of one or more static images and/or a continuous video display via streamed data from the device 100. In this way, conditions of the target can be monitored by a user at a location remote from the device 100, such as in real-time. Moreover, the two-way communication between the device 100 and the remote monitoring facility can allow a user at the remote monitoring facility to send commands to the device 100. Commands that can be sent from the remote monitoring facility to the device 100 can include commands pertaining to initial setup of the device 100 (including settings of sensors and components of the device 100), start/stop collection of visible light and/or infrared data, and positioning of the device 100 (e.g., initial positioning during setup or subsequent post-setup positioning). In some cases, instead of using the control panel 110 to setup the device 100, commands can be sent from the remote monitoring facility to the device 100 for accomplishing the same setup as would otherwise be done locally at the device 100 via the control panel 110.

Figure 1D:
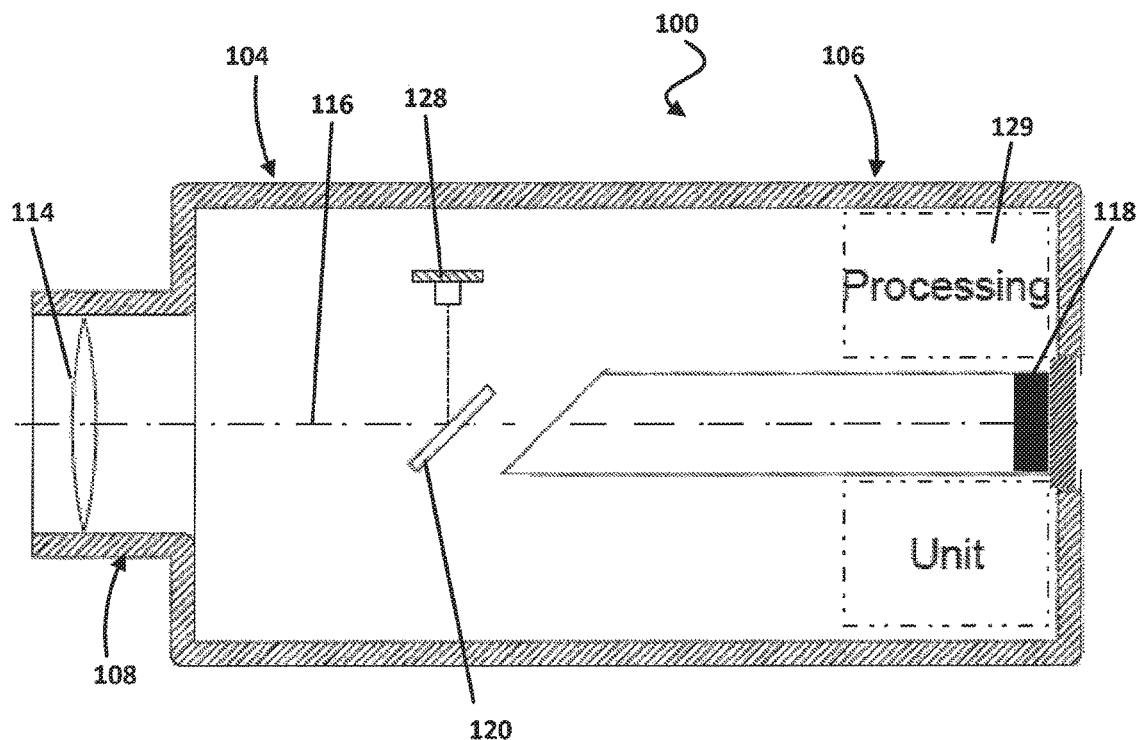
FIG. 1D is a cross-sectional view of another example of the non-contact temperature measurement device of FIGS. 1A and 1B.

FIG. 1D shows a cross-sectional view of an exemplary alternative configuration of the device 100. Like reference characters used in FIG. 1D are intended to denote like features described previously. As shown, the embodiment of the device 100 in FIG. 1D does not include control panel 110, sighting arrangement 122, and eyepiece 124. As such, the embodiment of the device 100 shown here may be most appropriately included in a remote monitoring and control application, such as in conjunction with the remote monitoring station as described elsewhere.

The embodiment of the device 100 shown in FIG. 1D also includes the visible light sensor 118 at a different position relative to that shown in FIG. 1C. Specifically, the visible light sensor 118 is positioned along the optical axis 116 at the rear portion 106 of the device 100. As such, the visible light beam splitter 120 is no longer present. In some examples, the embodiment of the device 100 as shown here need not include the infrared sensor 128, and in such examples the infrared beam splitter 120 could also be removed. However, where the infrared sensor 128 is included at the position shown, the infrared beam splitter 120 can be transparent to the visible light energy directed from the lens assembly 108 along the optical axis 116 so as to not impair the functioning of the visible light sensor 118 positioned as shown. In some instances, a physical reticle may be included along the optical axis forward of at least the visible light sensor 118 such that the reticle is imposed on the visible light captured by the sensor 118. It is to be noted that where the infrared sensor 128 is included, the positioning of the sensors 118 and 128 as shown in FIG. 1D can be interchangeable, such that the infrared sensor 128 is located along the optical axis 116 (e.g., at the rear portion 106) and the visible light sensor 118 is offset from the optical axis 116.

Conditions within the environment of the device 100 (e.g. vibrations) can result is the device 100 periodically becoming misaligned, such as instances where the measurement zone of the device 100 is no longer located on the desired target. Where the device 100 is positioned in a hard-to-reach location, periodic manual inspection of the device 100 using the sighting arrangement 122 to ensure proper alignment with the target can be inefficient and impractical. Moreover, in many such cases misalignment of the device 100 can result in false readings being output by the device 100 creating a safety hazard only knowable, and thus correctable, once the next periodic manual inspection occurs. For such reasons, the device 100 as described here can utilize a misalignment analysis feature to detect when the measurement zone of the device 100 has become misaligned relative to the desired target.

Figure 2:
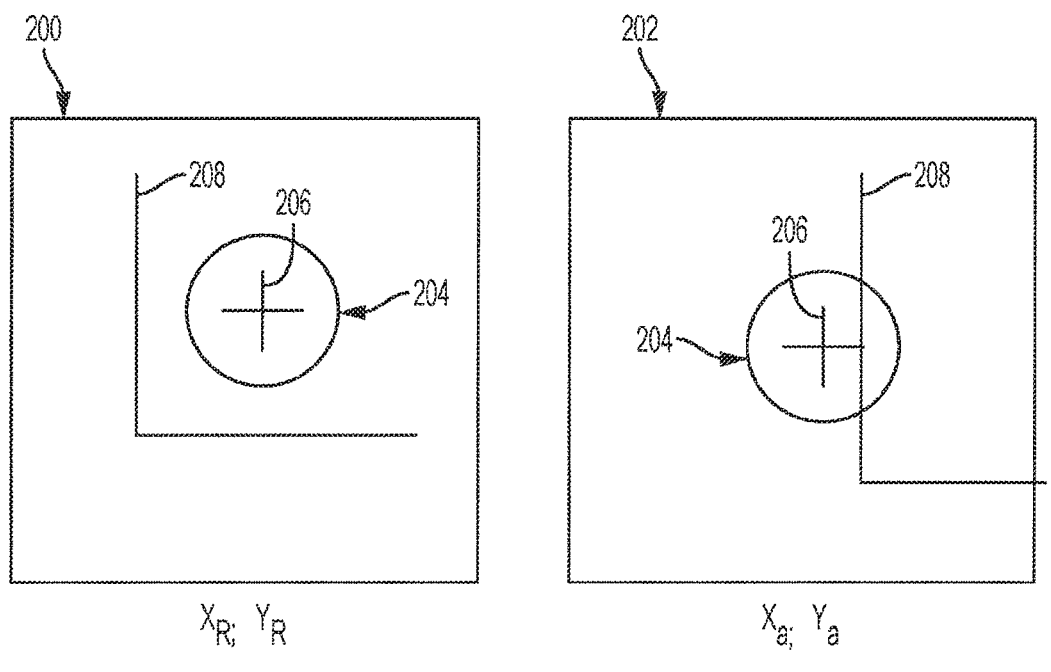
FIG. 2 is schematic diagram illustrating an example of a misalignment analysis.

FIG. 2 shows a schematic diagram illustrating an example of a misalignment analysis. Image 200 shows a properly aligned detector, while image 202 shows a misaligned detector. As can be seen from the properly aligned detector of image 200, a measurement zone 204, indicated by a visual indicator 206 (e.g., a reticle), of the detector is aligned on a desired target 208 (e.g., portion of a desired target). Yet, in the misaligned detector image 202 the measurement zone 204, again indicated by the visual indicator 206 (e.g., the reticle), of the detector is no longer aligned on the desired target 208. Such misalignment can occur after the detector is installed and while the detector is operating in any of variety of environments.

The misalignment analysis feature can act to detect when the measurement zone 204 of the detector is no longer aligned on the desired target 208, or a particular portion of a desired target. In one example of the misalignment analysis, when the device is first installed in the field and properly aligned on a desired target (e.g., using the reticle or other visual indicator of the device, either manually at the mounting location or remotely through the monitoring station) a visible light image can be captured by the device, such as image 200. Proper alignment at installation can be verified using the eyepiece locally at the detector or using visible light image data communicated from the detector to the computing device at the remote monitoring facility, where such communicated image data corresponds to an image as may otherwise be seen through the eyepiece when present. This initial visible light image can be saved, such as to memory of the device and/or communicated to the computing device at the remote monitoring station and saved to memory there. The initial visible light image can be saved so as to have the visual indicator 206, such as the reticle, included on the image. For instance, the saved initial visible light image can have the reticle, or other suitable indicator, present as a result of a physical reticle or other visual indicator 206 present in the device 100 as described previously. In another instance, the saved initial visible light image can have the reticle or other visual indicator 206 super imposed upon it via computer generation (e.g., by registering an appropriate number of pixels corresponding to the visible light image to recreate the visual indicator, such as the reticle, in the saved image). In this instance, the reticle or other visual indicator 206 then need not be physically present within the device 100, but may instead be simulated on the saved image. In various examples, the visual indicator 206 is a reference that is not part of physical structure of the desired target itself, but instead may be generated for purposes of the misalignment analysis feature (e.g., by the device 100, by software run at a remote location, etc.).

The saved initial visible light image including the visual indicator (e.g., image 200) can be used in the misalignment analysis as a reference for measuring displacement of the measurement zone 204 relative to the target 208 (or portion of a target) at other times. To determine the extent of any displacement of the measurement zone 204 relative to the target 208, the device can capture a visible light image, such as image 202, subsequent to capturing the initial visible light image, such as image 200. The subsequent visible light image (e.g., image 202) can be saved, such as to memory of the device and/or communicated to the computing device at the remote monitoring station and saved to memory there. This subsequent visible light image can also be saved so as to have the visual indicator 206, such as the reticle, included on the image. The misalignment analysis can then compare a change in position of the visual indicator 206 between the initial visible light image (e.g., image 200) and the subsequent visible light image (e.g., image 202) to ascertain the extent to which the measurement zone 204 of the device has become misaligned over such period of time relative to the target 208.

In one example, the misalignment analysis can compare a change in position of the visual indicator 206 between the initial visible light image and the subsequent visible light image by calculating a change in horizontal and/or vertical positions of the visual indicator 206 between the images. For instance, the initial visible light image can have an associated horizontal (e.g., x-coordinate) position and/or vertical (e.g., y-coordinate) position of the visual indicator 206. Such horizontal and vertical positions of the visual indictor can be of a particular point of the visual indicator, such as a center point of the visual indicator. As noted previously, in some applications the measurement zone of the device may not have clearly delineated borders, but may instead be blurred or fuzzy. To more accurately determine movement of the measurement zone of the device, using a center point of the measurement zone can be beneficial so as to avoid incorporating any inconsistencies resulting from a blurred measurement zone border. Similarly, the subsequent visible light image can have an associated horizontal position and/or vertical position of the visual indicator, such as the same center point of the visual indicator as used with the initial visible light image. The horizontal and/or vertical positions of the measurement zone of the initial and subsequent images can be measured relative to any object (e.g., the target), and in most cases the object to which the positions are measured relative to will be the same for both the initial and subsequent images. The extent to which the measurement zone of the device has become misaligned can then be ascertained, for instance, by determining a difference between the horizontal position of the measurement zone in the initial and subsequent images and/or a difference between the vertical position of the measurement zone in the initial and subsequent images.

In some embodiments, the misalignment analysis is performed by the processor of the device 100. In other embodiments, the misalignment analysis is performed by a computer external to the device, such as a computer at the remote monitoring facility or a computer networked between the device and the remote monitoring facility (e.g., a remote computer, a cloud based computer, etc.). The misalignment analysis can include algorithms or programs for feature extraction, feature description, and camera localization. Programs for feature extraction finds points in a first visible light image that are likely to be easily distinguished in other images in the same area. Examples of known algorithms that may be used in a feature extraction program in embodiments of the invention include CenSurE (Center surround Extremas), algebraic models, and the Harris Corner Detector, for example. Program information for feature description takes the points found in the feature extraction process and gives them a description that is likely to be similar across all images of that same point. Examples of known algorithms that may be used in a feature descriptor program in embodiments of the invention include CHoG (Compressed Histograms of Gradients), Global Context Descriptors, and FFT/DCT Based Descriptor, for example. Camera localization or pose estimation program information uses a set of features recognized across multiple images to determine the current camera location in comparison to a desired camera location. Examples of known algorithms that may be used in a camera localization or pose estimation program in embodiments of the invention include Viewfinder Alignment, 5-Point Algorithm, Interval Analysis, and Fundamental Matrix Matching, for example.

In some embodiments, the misalignment analysis can run continuously while the device is in operation. In other embodiments, the misalignment analysis can run when an input command is received at the device (e.g., from the remote monitoring facility) to verify the alignment of the device. In yet other embodiments, the misalignment analysis can be programmed to be run automatically at set intervals of time (e.g., every 30 seconds, etc.). In such embodiments, the device may capture a new visual light image and save this new image with the visual indicator included to represent the present location of the measurement zone at each such interval. The misalignment analysis can then compare a change in position of the visual indicator 206 between the initial visible light image (e.g., taken when the device is aligned at installation) and the subsequent visible light image taken at the interval to ascertain the extent to which the measurement zone 204 of the device has become misaligned relative to the target 208. Such process can then be repeated at the desired intervals for any number of visible light images captured subsequent to the initial image.

Although the exemplary description provided up to this point refers to use of the visual indicator 206 in the misalignment analysis, other embodiments need not employ the visual indicator 206 in the misalignment analysis. Instead, the misalignment analysis may detect misalignment of the measurement zone 204 using only the target 208 (i.e. without reference to the visual indicator 206). In one such example, a particular location on the target 208 is used as a reference in the misalignment analysis (e.g., in lieu of a generated visual indicator). The particular location on the target used as the reference can be, in one example, a feature set of the physical structure of the target present in the captured first visible light image 200. This same feature set of the target can then be captured in the second, subsequent visible light image 202. In this example, similar to the examples described previously using the visual indicator, the particular location on the target 208 (e.g., the feature set) may be used in the misalignment analysis to compare a change in position of that particular location on the target 208 between the initial visible light image 200 and the subsequent visible light image 202. This can be done, for instance, by calculating a change in horizontal and/or vertical positions of the particular location on the target 208 (e.g., the feature set) between the images.

In addition to, or as an alternative to, the examples provided herein, various other means can be utilized in the misalignment analysis to ascertain the extent to which the measurement zone 204 of the device has become misaligned relative to the target 208. One example includes using only thermal images (e.g., captured by the infrared sensor 128) as both the first and subsequent images, and performing the described misalignment analysis on such thermal images. Another example includes utilizing rephotography concepts where infrared and visible light images are used in combination, in some cases in conjunction with multiple imaging devices. Embodiments of such rephotography are described in the following disclosures, each of which is hereby incorporated by reference in its entirety: U.S. patent application Ser. No. 12/196,433 titled "Infrared and Visible-Light Image Registration;" U.S. patent application Ser. No. 13/331,633 titled "Thermal Imaging Camera for Infrared Rephotography;" U.S. patent application Ser. No. 13/331,644 titled "Thermal Imaging Camera for Infrared Rephotography;" and U.S. patent application Ser. No. 13/336,607 titled "Thermal Imaging Camera for Infrared Rephotography."

Once the extent to which the measurement zone of the device has become misaligned relative to the target is ascertained, the misalignment analysis can provide an indication that the measurement zone of the device has become misaligned relative to the target. In some cases, a misalignment indication can be output, for example at the remote monitoring station and/or device 100 (e.g., at the control panel thereof), when any change in any one direction of a position of the measurement zone of the device has occurred. In other instances, the misalignment indication can be output when a change of a position of the measurement zone of the device exceeds a predetermined threshold amount. Such a predetermined threshold amount can vary based on the application of the device 100. For instance, where the target being imaged is a relatively hazardous object the predetermined threshold can be relatively low as compared to a more innocuous object.

In some embodiments, the misalignment analysis may determine that no misalignment of the measurement zone relative to the target has occurred, or that the misalignment is below a predetermined threshold. In such embodiments, the misalignment analysis can output an indication confirming proper alignment of the measurement zone of the device with the desired target and/or indicating no action is presently needed to reposition the device.

Figure 3:
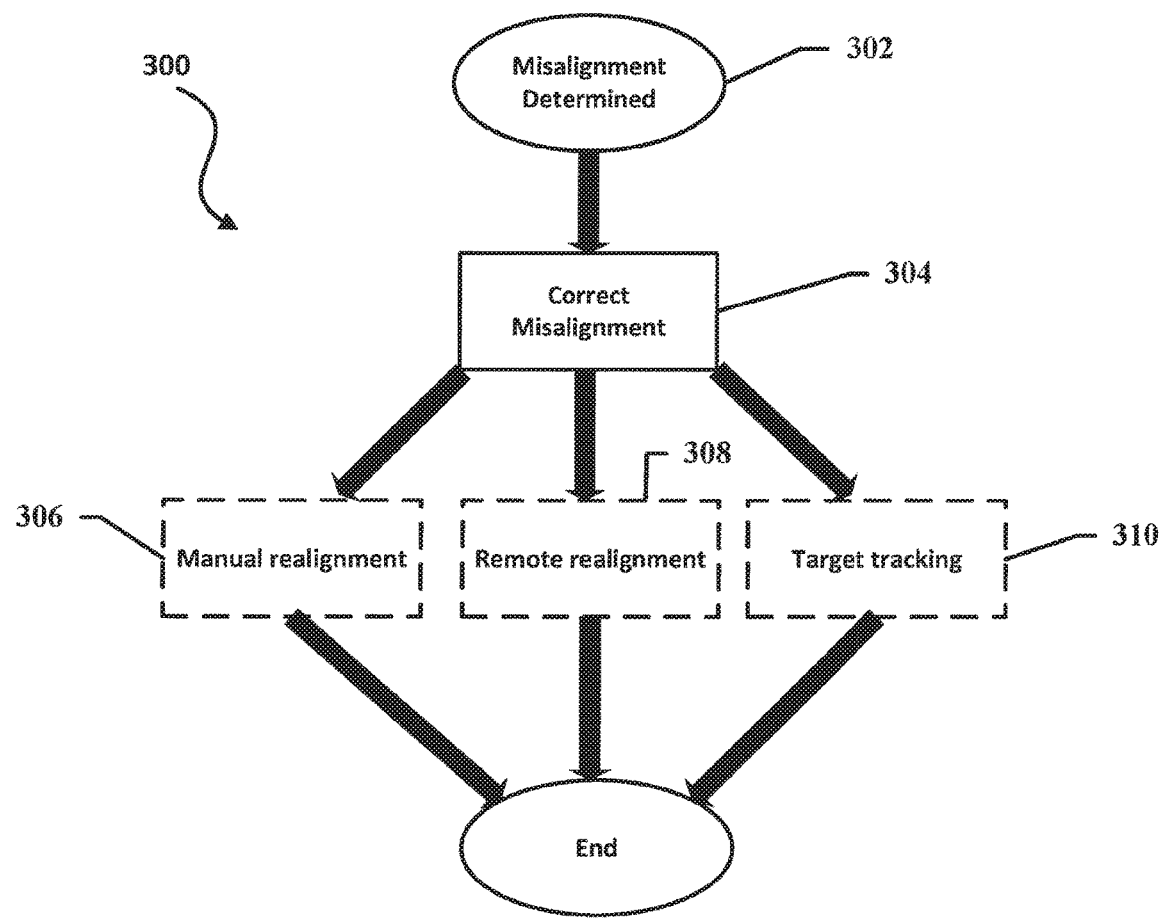
FIG. 3 is a flowchart illustrating an exemplary method for correcting an alignment of a non-contact temperature measurement device.

When misalignment of the device has been determined, the device can be repositioned so as to be properly aligned with the desired target, or portion of the target. FIG. 3 is a flowchart illustrating an exemplary method 300 for correcting an alignment of the device. Misalignment is determined (302) as described previously to ascertain the extent to which the measurement zone of the device has become misaligned relative to the target. In particular, the extent of misalignment can be a specific numerical measurement of the change in position of the measurement zone in conjunction with a direction in which the misalignment has occurred.

When misalignment of the measurement zone of the detector relative to the target has occurred, such misalignment can be corrected (304) so as to realign the measurement zone with the desired target. As noted, in some examples misalignment can be corrected only when the ascertained extent of the misaligned exceeds a predetermined threshold, but in other examples misalignment can be corrected when any degree of misalignment has occurred.

The misalignment of the measurement zone of the device relative to the target can be corrected in several ways. In one example, the device can be manually realigned (306). Manual realignment of the device can be done locally at the device upon receiving a misalignment indication resulting from the misalignment analysis. Manual realignment can be done, for instance, using the eyepiece and reticle of the device so as to reposition the measurement zone of the device onto the desired target. Once the device has been properly realigned onto the target, the device can be secured in place at such position so that the measurement zone is directed at the desired location.

In another example, the device can be remotely realigned (308). For instance, movement commands can be sent from the remote monitoring station to the device to cause the device to be repositioned so as to be properly aligned with the target. Such movement commands can be sent by a user upon receiving an indication of misalignment. For example, a user at the remote monitoring station can utilize a live video stream received from the device showing the real-time position of the measurement zone relative to the target to provide specific movement commands to the device. Movement commands may also be sent to the device automatically (e.g., without user input) once the specific degree and direction of misalignment of the measurement zone has been determined. For example, an algorithm can be utilized to determine specific movement commands to be sent to the device using the numerical measurement of the change in position of the measurement zone in conjunction with a direction in which the misalignment has occurred resulting from the misalignment analysis. Movement commands communicated to the device can include particular pan and/or tilt commands, such as to a motorized accessory coupled to the device (e.g., coupled to the mounting component of the device).

In a further example, the device can be realigned to track a target (310). For example, the detector can capture and store multiple visible light images as described and determine an extent of misalignment of the measurement zone of the device. In some cases, however, the desired target can be a moving target. Thus, these visible light images can also be used to track a position of a target. For instance, a first and second visible light image can be compared to determine a change in position of the desired target between the two images. The extent of the change of position of the target can then be used in conjunction with the change in position of the measurement zone over the same images to reposition the device according to the change of position of the target and measurement zone. This can, in some cases, further include using an elapsed time between the respective times at which the two images are captured in combination with the ascertained change in position of the target so as to determine a rate at which the target is moving. In one example, the change in position of the target can be accounted for when determining an extent of the misalignment of the measurement zone so as to give a more accurate indication of the misalignment resulting from causes other than a moving target. This process can be repeated to track movement of a target (e.g., on an assembly line) and continually realign the device with the target as it moves. In this manner, a moving target can be aligned with a measurement zone of the device in a manner that accounts for not only the movement of the target, but also for any misalignment resulting from an altered position of the device itself (e.g., independent of the movement of the target).

As such, the misalignment analysis used in conjunction with the method 300 can act to ensure that the device, and in particular the measurement zone of the device, is substantially always focused on the desired target. As a result, those present near, or interacting with, the target can be confident that the device is providing information specific to the target itself and not some other location due to misalignment.

Example non-contact thermometers and related techniques have been described. The techniques described in this disclosure may also be embodied or encoded in a computer-readable medium, such as a non-transitory computer-readable storage medium containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), a hard disk, optical media, or other computer readable media.

For example, an external computer comprising such computer readable medium can receive corresponding visible light and/or non-contact temperatures from a device or from memory and perform misalignment analysis and/or misalignment correction processes using images as described herein. In some embodiments, various portions of the techniques can be embodied in multiple components. For example, the device can locally process the image data and pass the processed image data to an external computing device for determining misalignment of the measurement zone and/or correcting any such misalignment.

In further examples, embodiments of the invention can be embodied in a display system. The display system can be configured to receive visible light and temperature data and carry out processes such as those herein described. Exemplary display systems can include one or more processors, a display and a user interface for carrying out such processes. A display system can be incorporated into any appropriate device or system capable of receiving and processing image data.

Various embodiments have been described. Such examples are non-limiting, and do not define or limit the scope of the invention in any way. Rather, these and other examples are within the scope of the following exemplary embodiments.

What is claimed is:

1. A method for determining misalignment of an imaging device, the method comprising:
   capturing first visible light image data at a first time using the imaging device, the first visible light image data including a target and a visual indicator, the visual indicator included in the first visible light image data as a function of a location of a measurement zone of an infrared sensor of the imaging device;
   determining a first position of the visual indicator relative to the target in the first visible light image data;
   capturing second visible light image data at a second time using the imaging device, the second time being subsequent to the first time, the second visible light image data including the target and the visual indicator, the visual indicator included in the second visible light image data as a function of a location of the measurement zone of the infrared sensor of the imaging device;
   determining a second position of the visual indicator relative to the target in the second visible light image data; and
   comparing the first position of the visual indicator to the second position of the visual indicator.

2. The method of claim 1, wherein the measurement zone is an area over which the infrared sensor of the imaging device detects infrared energy.

3. A non-transitory computer-readable medium comprising instructions for causing a programmable processor to:
   receive first visible light image data corresponding to a first visible light image captured by an imaging device;
   determine a first position of a visual indicator relative to a target in the first visible light image data, the visual indicator included in the first visible light image data as a function of a location of a measurement zone of an infrared sensor of the imaging device;
   receive second visible light image data corresponding to a second visible light image captured by an imaging device at a time after capturing the first visible light image;
   determine a second position of the visual indicator relative to the target in the second visible light image data, the visual indicator included in the second visible light image data as a function of a location of the measurement zone of the infrared sensor of the imaging device; and
   compare the first position of the visual indicator to the second position of the visual indicator.

4. The medium of claim 3, wherein the measurement zone corresponds to an area over which the infrared sensor of the imaging device detects infrared energy.

5. The method of claim 1, further comprising:
   generating a misalignment indication as a result of comparing the first position of the visual indicator to the second position of the visual indicator.

6. The method of claim 5, wherein the misalignment indication is generated when the second position of the visual indicator corresponds to a location of the measurement zone of the infrared sensor that is offset from the target.

7. The method of claim 1, wherein comparing the first position of the visual indicator to the second position of the visual indicator comprises a numerical measurement of a difference between the first position of the visual indicator and the second position of the visual indicator.

8. The method of claim 7, wherein the numerical measurement is relative to a center point of the visual indicator at each of the first position of the visual indicator and the second position of the visual indicator.

9. The medium of claim 3, wherein the instructions further cause the programmable processor to:
   generate a misalignment indication as a result of comparing the first position of the visual indicator to the second position of the visual indicator.

10. The medium of claim 9, wherein the misalignment indication is generated when the second position of the visual indicator corresponds to a location of the measurement zone of the infrared sensor that is offset from the target.

11. The medium of claim 3, wherein comparing the first position of the visual indicator to the second position of the visual indicator comprises generating a numerical measurement of a difference between the first position of the visual indicator and the second position of the visual indicator.

12. The medium of claim 11, wherein the numerical measurement is relative to a center point of the visual indicator at each of the first position of the visual indicator and the second position of the visual indicator.

* * * * *